US008788609B2

(12) United States Patent
Biedermann et al.

(10) Patent No.: US 8,788,609 B2
(45) Date of Patent: Jul. 22, 2014

(54) AUTOMATION DEVICE AND AUTOMATION SYSTEM

(75) Inventors: Andreas Biedermann, Chemnitz (DE); Bernhard Weissbach, Frankenberg (DE)

(73) Assignee: Siemens AG, Munich (DE)

( * ) Notice: Subject to any disclaimer, the term of this patent is extended or adjusted under 35 U.S.C. 154(b) by 320 days.

(21) Appl. No.: 12/775,129

(22) Filed: May 6, 2010

(65) Prior Publication Data

US 2010/0287255 A1  Nov. 11, 2010

(30) Foreign Application Priority Data

May 8, 2009  (EP) .................................... 09159775

(51) Int. Cl.
*G06F 15/16* (2006.01)

(52) U.S. Cl.
USPC ........ 709/208; 711/2; 711/211; 711/E12.067; 710/2; 710/3; 710/8

(58) Field of Classification Search
USPC ........... 709/208; 711/211, 2, E12.067; 710/2, 710/3, 8
See application file for complete search history.

(56) References Cited

U.S. PATENT DOCUMENTS

| 5,734,858 | A * | 3/1998 | Patrick et al. ................. 711/208 |
| 5,950,014 | A * | 9/1999 | Hickerson et al. .............. 710/14 |
| 6,662,251 | B2 * | 12/2003 | Brock et al. ................... 710/110 |
| 6,754,720 | B1 * | 6/2004 | Packer ............................. 710/3 |
| 6,877,101 | B2 | 4/2005 | Barthel et al. |
| 7,457,900 | B2 * | 11/2008 | Panesar ........................... 710/104 |
| RE40,817 | E * | 6/2009 | Krivoshein et al. ............... 700/1 |
| 7,702,834 | B2 * | 4/2010 | Beckhoff et al. .............. 710/110 |
| 7,882,327 | B2 * | 2/2011 | Kalyanasundharam et al. ............................. 711/202 |
| 8,107,485 | B2 * | 1/2012 | Weber ........................... 370/401 |
| 8,170,722 | B1 * | 5/2012 | Elberbaum .................... 700/295 |
| 8,171,196 | B2 * | 5/2012 | Schott ........................... 710/107 |
| 2002/0131454 | A1 * | 9/2002 | Franke et al. ................. 370/503 |
| 2003/0053441 | A1 * | 3/2003 | Banerjee ....................... 370/352 |
| 2005/0066320 | A1 * | 3/2005 | Petig et al. .................... 717/146 |
| 2005/0114577 | A1 * | 5/2005 | Beckhoff et al. .............. 710/110 |
| 2006/0190094 | A1 * | 8/2006 | Gehlen et al. ..................... 700/1 |
| 2006/0222608 | A1 | 10/2006 | Yang et al. |
| 2006/0253614 | A1 * | 11/2006 | Melton ............................. 710/2 |
| 2007/0058654 | A1 * | 3/2007 | Arnold et al. ................. 370/437 |
| 2008/0133721 | A1 | 6/2008 | Danz et al. |
| 2008/0189417 | A1 * | 8/2008 | Dea et al. ...................... 709/226 |

(Continued)

FOREIGN PATENT DOCUMENTS

| CN | 1820233 | 8/2006 |
| CN | 101019107 | 8/2007 |

(Continued)

*Primary Examiner* — Alina N Boutah
(74) *Attorney, Agent, or Firm* — Cozen O'Connor

(57) ABSTRACT

An automation device comprising a first functional unit, a second functional unit, a first network connection for connection to a first data network and a bus master unit for connecting a peripheral component. The first functional unit includes a first interface unit that is assigned a first network address, and the second functional unit includes a second interface unit that is assigned a second network address. A partitioning device can be used to logically partition an address space of the peripheral component, and a first address space can be directly assigned, as a partitioned part of the address space, to a superordinate computation unit that can be connected through the first network connection.

16 Claims, 3 Drawing Sheets

(56) References Cited

U.S. PATENT DOCUMENTS

| | | |
|---|---|---|
| 2008/0307116 A1* | 12/2008 | Boyd et al. ................... 710/4 |
| 2009/0119437 A1 | 5/2009 | Hilscher |
| 2009/0217377 A1* | 8/2009 | Arbaugh et al. ............. 726/23 |
| 2010/0005272 A1* | 1/2010 | Vuletic et al. ............ 711/213 |
| 2010/0008372 A1* | 1/2010 | Weber ...................... 370/401 |
| 2010/0146176 A1* | 6/2010 | Beckhoff et al. ........... 710/110 |
| 2010/0211201 A1* | 8/2010 | Papenfort et al. ........... 700/95 |
| 2010/0260176 A1 | 10/2010 | Hartwich |
| 2011/0213472 A1* | 9/2011 | Clayton et al. ............. 700/11 |
| 2013/0138975 A1* | 5/2013 | Martinez et al. ............ 713/193 |

FOREIGN PATENT DOCUMENTS

| | | |
|---|---|---|
| CN | 101310231 | 11/2008 |
| DE | 103 09 168 | 9/2004 |
| DE | 10 2004 007 233 | 5/2005 |
| WO | WO 00/19286 | 4/2000 |
| WO | WO 2004/077760 | 9/2004 |
| WO | WO 2006/136201 | 12/2006 |

\* cited by examiner

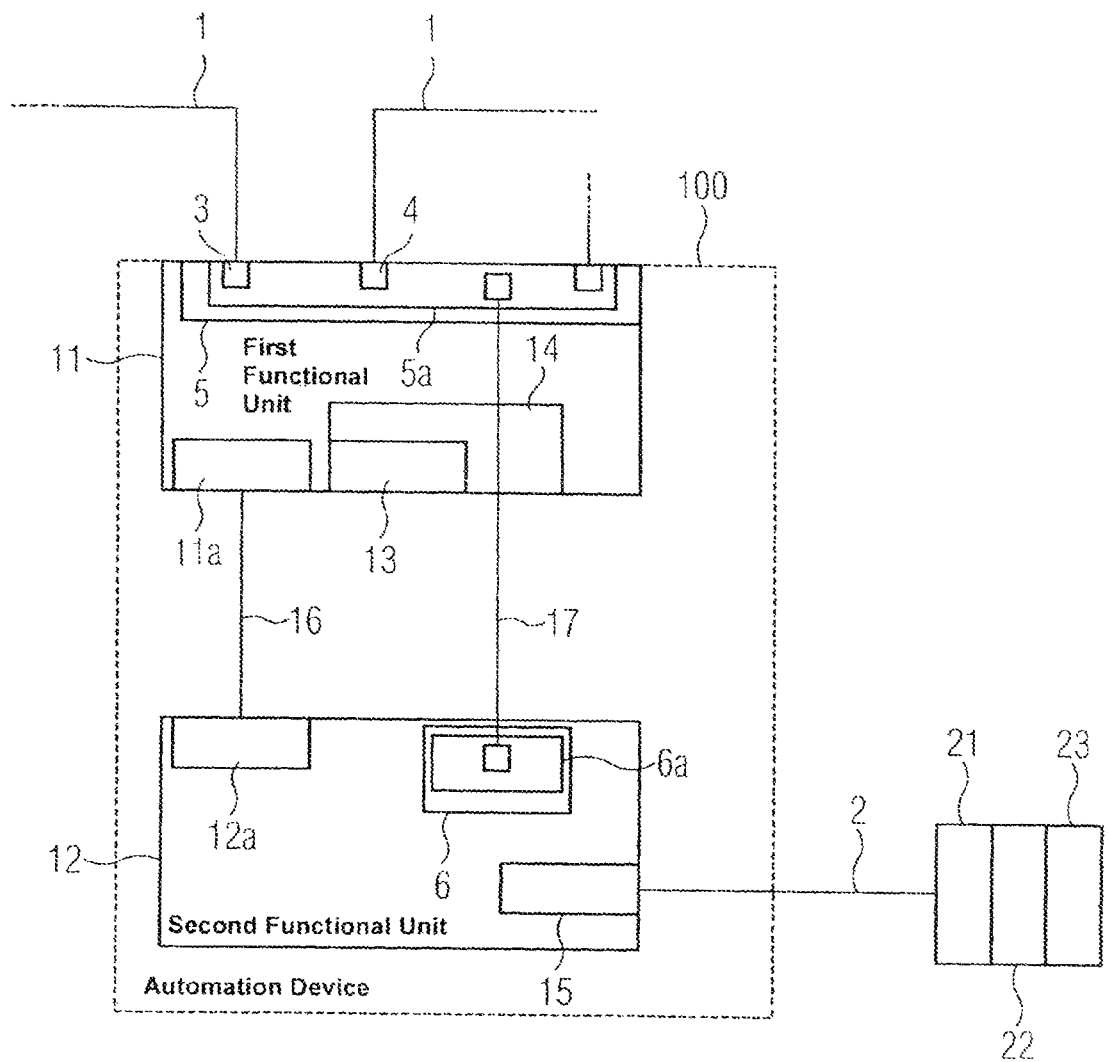

AUTOMATION DEVICE AND AUTOMATION SYSTEM

BACKGROUND OF THE INVENTION

The invention relates to an automation device comprising a first functional unit, a second functional unit, a first network connection for connection to a first data network and a bus master unit for connecting a peripheral component.

Automation devices having on-board peripherals or peripherals which can be plugged in a modular manner are known. Here, peripherals comprise, for example, input/output subassemblies or additional sensor subassemblies. Input/output signals from the peripherals are processed by the automation device or the input/output signals are forwarded or connected to a superordinate computation unit. This connection is preferably effected using a first data network. The first data network comprises a primary bus system. Particularly, in automation technology, however, there are also applications in which only some of the peripherals are intended to be processed or pre-processed in the automation device itself. The rest of the peripherals are intended to be allocated to the superordinate computation unit (also called the host system). A primary bus device for connecting additional peripherals to the superordinate computation unit may be connected to the primary bus system. Automation devices which have implemented a slave connection through virtual modules for Profibus are known. This slave connection is essentially restricted to the useful data. A user wishing to parameterize the automation device for a particular industrial application must create two separate plans for this purpose, one for the slave to a host system and one for the actual automation device. It is also necessary to plan for coupling between the peripherals and the superordinate computation unit. The operations for accessing the peripherals by an application program must also be programmed and the data must be copied from or to virtual modules. The disadvantage of this is that a response time of the peripherals, which are controlled by the superordinate computation unit, is correspondingly long.

SUMMARY OF THE INVENTION

It is therefore an object of the present invention is to improve the processing speed or the response time of an automation device.

This and other objects and advantages are achieved by an automation device in which a first functional unit includes a first interface unit which is assigned a first network address, and a second functional unit has a second interface unit that is assigned a second network address, a partitioning device usable to logically partition an address space of the peripheral component, and a first address space being directly assignable to a superordinate computation unit which is connectable through the first network connection, as a partitioned part of the address space. As a result, a multifunctional automation device is provided, which can both produce processing power for some of its own central peripherals and can provide some of these central peripherals to a superordinate host system as "fast" decentralized peripherals in a transparent manner.

The superordinate computation unit's (host system) view of the peripherals, which now appear to be transparent to the superordinate computation unit, corresponds to a view of decentralized peripherals on a primary bus device. In this case, the primary bus device functionality is intended to have the same properties offered by a standard device without pre-processing. Accordingly, the functional units are decoupled from one another to the greatest possible extent to meet these demands. Here, two independent interface units with their own network addresses are provided for this purpose. Preferably, the network addresses are provided in the form of IP addresses. The two different network addresses are used to decouple the two functional units in terms of planning and their hardware. A device functionality of such a device therefore need no longer be undertaken by a control system, which is primarily intended to undertake control tasks and thus is intended to have a high level of performance. As a result, a control system is now no longer adversely affected by additional coordination tasks for peripheral components. Here, the automation device includes, with its two functional units, two independent functions. The automation device is subdivided into two logic devices using the two functional units. Here, each interface unit is provided with its own IP address which is also visible in the first data network. These two logic devices are combined to form a multifunctional automation device.

In a further embodiment, the first interface unit includes a first network switch to which a first data line is connected that couples the first functional unit to the second functional unit. Preferably, a switch which enables coupling to the first data network through the first network connection and simultaneously implements communication coupling to the second functional unit over the first data line is used as the network switch. An access path from a superordinate computation unit to the second functional unit over the first functional unit is implemented with the data coupling using the two switches.

In a particularly advantageous embodiment, the first functional unit comprises a control system and the second functional unit comprises a communication unit for useful data connection.

In an alternative embodiment, the second functional unit comprises a control system and the first functional unit comprises a communication unit for useful data connection. In preferred embodiments, the control system comprises a programmable logic controller in an automation device. The programmable logic controller is used for sequence control in an industrial process. Here, the communication unit for useful data connection preferably comprises a decentralized peripheral (DP) slave. Such a DP slave enables the data connection of decentralized peripheral components (DP). These decentralized peripheral components may be, for example, input/output modules for receiving and outputting input and output signals, as are required for actuators and sensors in an industrial process.

It is also advantageous if the functional unit, which comprises a control system, includes the bus master unit. The bus master unit is used to connect peripheral components. Here, peripheral components comprise input/output subassemblies that are centrally plugged into an automation device or peripheral components that are distributed in the industrial production process in a decentralized manner and are then preferably connected to the bus master through a field bus.

Data and/or input/output values can be buffered in a memory interface. This memory interface is used as an interface between the two functional units. When configuring a two-processor architecture, one processor of the first functional unit can use a further processor of the second functional unit to access the memory interface thereof over a coupling line to interchange data.

In an optional embodiment, the functional unit, which comprises a communication unit, includes a second network switch that is connected to a second data line, where the second data line is routed to the outside to additionally connect a data network. It is thus possible to directly connect the respective functional unit to the outside world without communicating through the other functional unit.

In practical use, it has been found that the practice of combining the functional units to form a structural unit with a housing for integration in an industrial process facilitates the installation work.

In an automation system in accordance with the disclosed embodiments, system having a computation unit and an automation device, where the computation unit is connected to the automation device through a first data network, and a second data network connects the automation device to further peripheral components or automation components, the partitioning device is configured to logically partition the peripheral components and to enable a first access path from the computation unit to the first address space and a second access path from the automation device to the second address space.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the invention are explained in more detail using the drawing, in which:

FIG. 3 shows an alternative exemplary alternative embodiment of the automation device of FIG. 1 in accordance with a second architecture.

DETAILED DESCRIPTION OF THE PRESENTLY PREFERRED EMBODIMENTS

Figure 1:
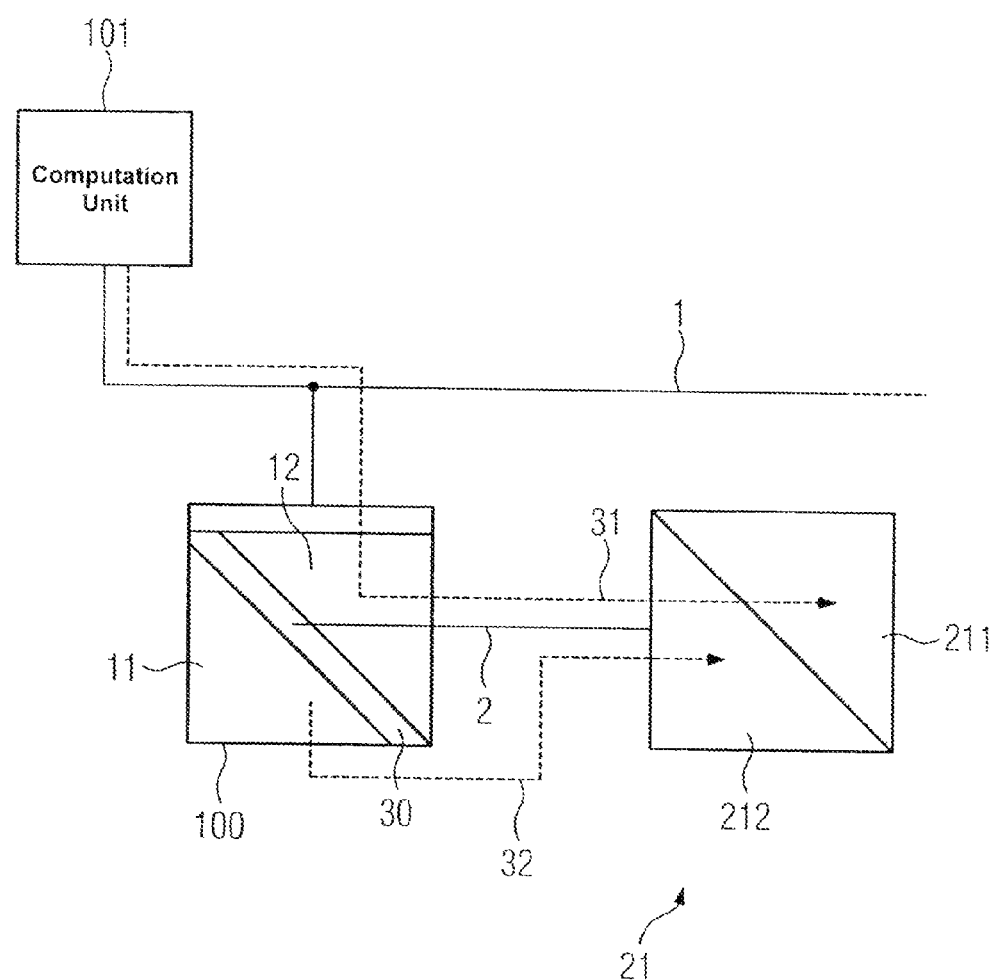
FIG. 1 shows an exemplary block diagram of an automation system including an automation device in accordance with the invention.

FIG. 1 illustrates an automation system having a computation unit 101, an automation device 100 and a first peripheral component 21. The computation unit 101, which can be considered to be a superordinate host system or a superordinate host computer, is coupled to the automation device 100 through a data network 1 to interchange data. The automation device 100 comprises a first functional unit 11 and a second functional unit 12. In the automation device 100, the functional units 11, 12 represent two independent logic devices, i.e., a control system, such as a programmable logic controller, and a communication unit such as an automation component for connecting decentralized peripherals. Here, the automation device comprises a structural unit, where a housing accommodates the first functional unit 11 and the second functional unit 12.

If the computation unit 101 considers the automation device 100 from the point of view of the first data network 1 (primary network), the automation device 100 appears to the computation unit 101 as two logic devices in the network topology considered. This is achieved because each functional unit is allocated an independent network address (IP address). In addition, an engineering system, which is connected to the first data network, and has planning software for the automation device 100, sees two logic devices that need to be separately planned using the engineering system.

Here, the first functional unit includes a first network address IP (1) and the second functional unit has a second network address IP (2). A partitioning device 30 arranged in the automation device 100 can be used to logically partition an address space of the first peripheral component 21. The first peripheral component 21 has been symbolically partitioned into a first address space 211 and a second address space 212 by diagonal line. The first peripheral component 21 is connected to the automation device 100 through a second data network 2. Consequently, useful data can be interchanged over this data connection.

The logical partitioning into a first address space 211 and a second address space 212, where the address spaces 211, 212 function disjointly with respect to one another, makes it possible for the computation unit 101 to be directly coupled to the first address space 211 over a first access path 31. Here, the address space 211 is spanned, for example, by a number of digital inputs of an input/output subassembly.

On the other hand, the second address space 212 is spanned by the same digital input/output subassembly, the part of the disjoint set only affecting the digital outputs in this case. The automation device 100 can therefore use its first functional unit 11 to directly retrieve the digital outputs of the input/output subassembly from the address space 212 over a second access path 32.

The automation device 100 can therefore be advantageously used to directly provide a section of peripherals to a superordinate computation unit 101 without the automation device still being burdened with communication management tasks.

Figure 2:
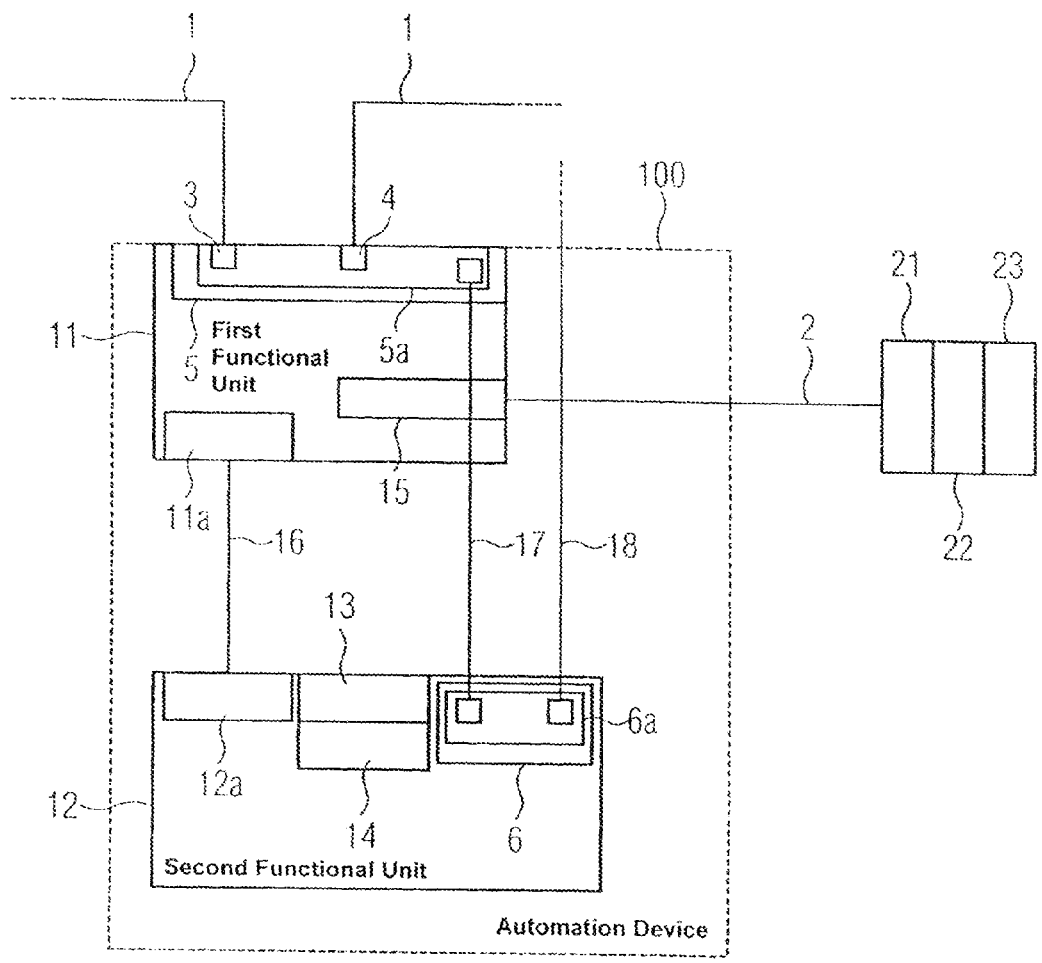
FIG. 2 shows an exemplary embodiment of the automation device of FIG. 1 in accordance with a first architecture.

FIG. 2 illustrates the automation device 100 in more detail in a first architecture in accordance with an embodiment. The automation device 100 (represented by a dashed line) represents a structural unit with a housing. The first functional unit 11 and the second functional unit 12 are arranged inside this housing. Here, the second functional unit 12 comprises a communication unit for useful data connection. The first functional unit 11 includes a first network connection 3 and a second network connection 4. The first functional unit 11, i.e., a control unit, is in line with the first data network 1 through the network connections 3, 4. The first data network 1 can also be considered to be a primary bus. The second functional unit 12 is connected to the first functional unit 11 (control unit) by a first switch 5a integrated in a first interface unit 5 and is thus also connected to the first data network 1. The first switch 5a is connected to the second functional unit 12 by a first data line 17. The first functional unit 11 includes a first processor 11a which is coupled to a second processor 12a of the second functional unit 12 by a coupling line 16. The first processor 11a can use the coupling line 16 to interchange data with the second processor 12a, the data also being able to originate from the memory interface 13. In this so-called two-processor architecture, the memory interface is an interface with buffer functionality between the two processors 11a, 12a. In order to connect a first peripheral component 21, a second peripheral component 22 and a third peripheral component 23 to the first functional unit 11 over a second data network 2, the first functional unit includes a bus master 15. As a result, the automation device 100 can be recognized as two logic devices over the first data network 1, where a first network address is implemented in a first interface unit 5 and a second network address is implemented in the second interface unit 6. A superordinate computation unit 101 (see FIG. 1) connected to the first data network 1 can therefore recognize the first interface unit 5 with a first IP address (IP 1) over the first data network 1 and can also recognize the second interface unit 6 with a second network address (IP 2) over the connection between the first interface unit 5 and the second interface unit 6 using the first data line 17.

FIG. 3 illustrates an alternative exemplary embodiment in an alternative architecture. The automation device 100 again includes a first functional unit 11 and a second functional unit 12. Here, however, the first functional unit 11 comprises a communication unit and the second functional unit 12 comprises a control unit. Here, the automation device 100 can now be considered to be a control CPU with a device functionality for decentralized peripherals. Here, the device is located upstream of the CPU in terms of circuitry. The CPU is coupled by a switch integrated in the device. This coupling is implemented in the functional unit 11 by the first interface unit 5 in which a first switch 5a is integrated. For this purpose, a connection to the second interface unit 6 is implemented in a first switch 5a by a first data line 17. A second switch 6a is again integrated in the second interface unit 6. This second switch 6a of FIG. 3 could also be of the same design as the second switch 6a of FIG. 2 and could enable a further connection option to the second switch 6a over a second data line 18 (see FIG. 2 that is routed alternally to further connect a data network.

Moreover, in accordance with the contemplated embodiment, the first functional unit 11 includes a first processor 11a and the second functional unit 12 includes a second processor 12a which are connected to one another by a coupling line 16. The first functional unit 11 functioning as a communication unit includes a memory interface 13 with a RAM module 14.

A bus master 15 is integrated in the second functional unit 12 to connect the peripheral components 21, 22, 23. The bus master 15 is connected to the peripheral units 21, 22, 23 via the second data network 2. The second data network 2 may be configured, for example, as a field bus, preferably as a Profibus. However, it would also be likewise conceivable for the second data network 2 to be an integrated communication bus in the automation device, to which input/output subassemblies can be plugged in a modular manner to expand decentralized peripherals.

As a result of the fact that the functional units 11, 12 are each implemented with their own network address (IP address), each functional unit 11, 12 can be assigned its specific functionality based on the view from the superordinate computation unit 101. Both devices, i.e., the control unit and the communication unit, now share connected central peripherals over the second data network 2, such as a secondary bus. The actual peripheral resources, as represented by the first to third peripheral components 21, 22, 23, are present only once as a peripheral resource. These peripheral resources are disjointly partitioned by allocating two different IP addresses by corresponding planning using a planning tool, such as an engineering system, which is connected to the automation device 100. Instead of the connection between the control unit and the peripheral components 21, 22, 23, it is also possible to forward the primary bus to the peripherals which can again also consist of one or more functional units.

The partitioning device 30 (see FIG. 1) comprises a freely programmable module, such as an application specific integrated circuit (ASIC) or a further processor. The partitioning device 30 is assigned firmware using the planning tool, where the partitioning information for the peripherals is stored in this firmware.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An automation device comprising:
    a first functional unit having a first interface unit which is assigned a first network address;
    a second functional unit operatively coupled to the first functional unit and having a second interface unit which is assigned a second network address;
    a first network connection operatively coupled to the first functional unit and for connection to a first data network;
    a bus master unit operatively coupled to the second functional unit and for connecting a peripheral component; and
    a partitioning device arranged in the automation device, said partitioning device being configured to logically partition an address space of the peripheral component, a first address space comprising a partitioned part of the address space and being directly assignable to a superordinate computation unit which is connectable over the first network connection to the automation device.

2. The automation device as claimed in claim 1, wherein the first interface unit includes a first network switch connected to a first data line which couples the first functional unit to the second functional unit.

3. The automation device as claimed in claim 1, wherein the first functional unit comprises a control system and the second functional unit comprises a communication unit for useful data connection.

4. The automation device as claimed in claim 2, wherein the first functional unit comprises a control system and the second functional unit comprises a communication unit for useful data connection.

5. The automation device as claimed in claim 1, wherein the second functional unit comprises a control system and the first functional unit comprises a communication unit for useful data connection.

6. The automation device as claimed in claim 2, wherein the second functional unit comprises a control system and the first functional unit comprises a communication unit for useful data connection.

7. The automation device as claimed in claim 3, wherein the control system includes the bus master unit.

8. The automation device as claimed in claim 5, wherein the control system includes the bus master unit.

9. The automation device as claimed in claim 3, wherein the communication unit includes a memory interface.

10. The automation device as claimed in claim 5, wherein the communication unit includes a memory interface.

11. The automation device as claimed in claim 7, wherein the communication unit includes a second network switch connected to a second data line routed externally to additionally connect a data network.

12. The automation device as claimed in claim 8, wherein the communication unit includes a second network switch connected to a second data line routed externally to additionally connect a data network.

13. The automation device as claimed in claim 9, wherein the communication unit includes a second network switch connected to a second data line routed externally to additionally connect a data network.

14. The automation device as claimed in claim 10, wherein the communication unit includes a second network switch connected to a second data line routed externally to additionally connect a data network.

15. The automation device as claimed in claim 1, wherein the automation device comprises a structural unit having a housing.

16. An automation system, comprising:
   a computation unit;
   an automation device;
   a first data network connecting the computation unit and the automation device; and
   a second data network connecting the automation device to at least one of further peripheral components and automation components;
   wherein the automation device comprises:
      a first functional unit having a first interface unit which is assigned a first network address;
      a second functional unit having a second interface unit which is assigned a second network address;
      a first network connection for connection to the first data network;
      a bus master unit for connecting at least one of the further peripheral components and the automation components over the second data network; and
      a partitioning device configured to logically partition an address space of at least one of the further peripheral components and the automation component units at least first and second address spaces, the first address space being directly assignable to the computation unit which is connectable over the first network connection, the partitioning device being further configured to enable a first access path from the computation into the first address space and a second access path from the automation device to the second address space.

* * * * *